United States Patent [19]

Bernstein et al.

[11] 3,931,116
[45] Jan. 6, 1976

[54] CURABLE AMINE-TERMINATED POLYURETHANE-UREA/EPOXIDE LACQUERS

[75] Inventors: Carl Bernstein, Deerfield; Konstantinos Arvanitis, Chicago; Yuen Ng, Chicago, all of Ill.

[73] Assignee: Witco Chemical Corporation, New York, N.Y.

[22] Filed: Mar. 14, 1974

[21] Appl. No.: 451,266

Related U.S. Application Data

[63] Continuation-in-part of Ser. No. 280,369, Aug. 14, 1972, abandoned.

[52] U.S. Cl. 260/77.5 R; 260/18 TN; 260/29.2 TN; 260/32.6 N; 260/32.8 N; 260/33.4 UB; 260/33.6 UB; 260/77.5 CH; 260/830 P
[51] Int. Cl.$^2$.................. C08G 18/30; C08K 5/20
[58] Field of Search ...... 260/77.5 R, 830 P, 118 TN

[56] References Cited
UNITED STATES PATENTS

| | | | |
|---|---|---|---|
| 2,500,600 | 3/1950 | Bradley | 260/32.8 R |
| 2,888,439 | 5/1959 | Simons | 260/830 P |
| 3,290,208 | 12/1966 | Lewis et al. | 260/830 P |
| 3,296,179 | 1/1967 | Lister et al. | 260/31.2 |
| 3,374,186 | 3/1968 | Steden | 260/47 EN |
| 3,527,729 | 1/1971 | Bingham et al. | 260/37 |
| 3,565,972 | 2/1971 | Harris | 260/830 P |
| 3,636,133 | 1/1972 | Hawkins | 260/830 P |

FOREIGN PATENTS OR APPLICATIONS

| 2,196 | 1/1970 | Japan | 260/77.5 AM |

*Primary Examiner*—H. S. Cockeram
*Attorney, Agent, or Firm*—Albert L. Gazzola; Jordan J. Driks; Morton Friedman

[57] ABSTRACT

Amine-terminated polyetherurethane-urea polymers in a solvent, as for instance, isopropanol, toluene, and mixtures thereof, are chain-extended with as little as about 0.1 and up to 9 percent, by weight, based on the amine terminated polyetherurethane-urea, of a polyepoxide, such as a polyepoxide of p,p'-isopropylidenediphenol, of a phenolformaldehyde resin, epoxidized soybean oil, diglycidyl phthalate, and the like, to produce films, coatings, adhesives, and caulking having improved hydrolytic stability, and other improved physical properties.

17 Claims, No Drawings

CURABLE AMINE-TERMINATED POLYURETHANE/UREA/EPOXIDE LACQUERS

This application is a continuation-in-part of application Ser. No. 280,369, filed Aug. 14, 1972 now abandoned.

This invention relates to two component polymerforming compositions; one component being an amine terminated polyetherurethane-urea and a second component a polyepoxide, in a lacquer solvent system. The polyepoxide is added to a solution of an amine terminated polyetherurethane-urea in chain extending (coupling) amounts of up to about 9 percent, based on the amine terminated polyetherurethaneurea, to produce a chain-extended polyetherurethane-urea system from which coatings, films, or adhesives having improved hydrolytic resistance, and improved physical properties may be prepared.

The curing of a polyamine with an epoxide or polyepoxide and vice-versa is broadly speaking, well known in the art. This technology is found in the patent literature such as for instance in U.S. Pat. No. 2,500,600, issued to Bradley on Mar. 14, 1950; U.S. Pat. No. 2,829,984, issued to Yeager on Apr. 8, 1958; U.S. Pat. No. 2,880,194, issued to Glasser on Mar. 31, 1959; U.S. Pat. No. 3,374,186, issued to Steden et al. on Mar. 19, 1968; and U.S. Pat. No. 3,496,138, issued to Sellers et al. on Feb. 17, 1970.

U.S. Pat. No. 3,510,439, issued to Kaltenbach on May 5, 1970, discloses a polyurethane prepolymer formed by the reaction between toluene diisocyanate and a polyalkylene ether or ester glycol and characterized by an isocyanate content of from 4–10 percent, condensed with a low molecular weight liquid epoxy resin, a solid primary diamine and a naphthenate, tallate, or octoate salt of manganese, zinc, iron or lead, cured by heating. U.S. Pat. No. 3,565,972, issued to Harris on Feb. 23, 1971, discloses a high strength structural adhesive formulation which may be employed in either a one part or multipart composition. In both cases the formulation contains a polyurethane prepolymer formed by the reaction of TDI with a polyalkylene ether glycol, a low molecular weight liquid epoxy resin derived from bisphenol A and epichlorohydrin, a latent solid primary diamine, and a small amount of a Lewis acid-amine complex. U.S. Pat. No. 3,384,679, issued to Stetz et al. on May 21, 1968, discloses a product which is made by blending a thermoplastic polyester or polyetherurethane with a thermoplastic copolymer of bisphenol A and epichlorohydrin. The polyurethanes disclosed in this patent are not amine terminated and they are made by blending the thermoplastic polyurethane with a thermoplastic copolymer of bisphenol A and epichlorohydrin. The foregoing patents are incorporated herein by reference.

Japanese patent publication No. 2196/1970, discloses a process for preparing a urethane type graft-copolymer, by bonding a polyurethane elastomer, having a terminal amine or hydroxy group in virtue of being synthesized from a diol, diamine, hydrazine or water with a copolymeric polyepoxide. Large amounts of polyepoxide copolymers must be employed in the system disclosed in this Japanese patent, i.e. 10–90 percent to 90–10 percent, of copolymeric polyepoxide and polyurethane elastomer, respectively, i.e. a minimum of over 11 percent of copolymeric polyepoxide based on the polyurethane, to produce the therein disclosed graft copolymers. The graft copolymer product, according to the Japanese patent disclosure, acquires both the characteristics of the complex polyepoxy copolymer and the polyurethane elastomer. There is no indication in this patent of a two-component lacquer solution wherein a defined lacquer solvent solution of an amine terminated polyetherurethane-urea is chain-extended (coupled) with, a small amount i.e. as little as about 0.1 percent by weight, of a polyepoxide to increase the molecular weight of the amine-terminated polyetherurethane-urea of the present lacquer system. There is no graft-copolymerized polyepoxidepolyurethane in the present system as in the Japanese patent. A graft copolymer, such as in the Japanese patent, is a polymer molecule in which the main backbone chain has attached to it, at various points, side chains containing different atoms, or groups, from those in the main chain. (See the Condensed Chemical Dictionary P. 549, 1962). The present solution contains a chain extended amine terminated polyetherurethane-urea which is substantially devoid of side chains having different moieties on a main backbone chain. Instead, the present amine terminated polyetherurethane-ureas are coupled together with a small amount of polyepoxide, in a substantially linear pattern, to increase the molecular weight of said polyurethane while maintaining its elastomeric properties and improving its ability to produce hydrolytically stable films, coatings, adhesives and the like. Graft copolymers, such as in this Japanese patent, are not suitable in the present lacquer system for this purpose.

None of the art known to applicants makes available or in any way teaches the present two component system for making improved coatings, films, adhesives and the like.

Specifically this invention deals with a particular isocyanate terminated polyetherurethane prepolymer chain-extended with an excess of diamine, having at least one active hydrogen on each amine, particularly advantageously combined with a small amount of primary or secondary monoamine, in conventional organic solvents such as the known lacquer solvents, and very desirably containing a monohydric alcohol, chain-extended with a polyepoxide in an amount of from about 0.1 to about 9.0 percent and preferably between 1.0–5.0 percent, by weight of the amine terminated polyetherurethane urea, just before using, to increase the molecular weight of said amine terminated polyetherurethaneurea, as will be more fully described hereinafter.

The isocyanate terminated prepolymer is conventionally prepared from a difunctional polyalkylene ether glycol and a diisocyanate. The glycol ether can be poly (oxytetramethylene)glycol, poly(oxyethylene)glycol, poly (oxypropylene)glycol, and the like, and polyethers prepared from mixtures of epoxides, i.e. mixtures of two or more of ethylene oxide, propylene oxide, styrene oxide, epichlorohydrin, and the like, copolymers of the same and mixtures of any of the above. The isocyanate may be aliphatic, cycloaliphatic, or aromatic, such as hexamethylene diisocyanate, methylene bis(cyclohexyl isocyanate), toluene diisocyanate, and the like as known in the art. Such prepolymers appear throughout the patent literature, vide supra, and require no further discussion herein.

The prepolymer above is allowed to react with excess diamine, as stated hereinbefore, most advantageously a cycloaliphatic diamine, and 3-aminomethyl-3,5,5-trimethyl cyclohexylamine; 1,8-diamino-p-menthane;

and hexahydropyrazine, being particularly preferred. Although other aliphatic branched cyclic diamines may be employed, best results are obtained from the above cycloaliphatic diamines. Aromatic diamines are also operable, but because of discoloration by the aromatic moiety, they are not preferred. By "operable" is meant that the final films produced from the present two component solution have improved hydrolytic stability.

In the practice of the present invention, the isocyanate terminated prepolymer is allowed to react with excess diamine to form the polyetherurethane-urea, by adding the prepolymer to a solution of diamine, in a lacquer solvent such as toluene, xylene, acetone, methyl ethyl ketone, dimethylformamide, or other organic solvent, and preferably a mixture of solvents, including water, and even more desirable, containing an amount of $C_1$–$C_5$ monohydric alcohol such as methanol, ethanol, isopropanol, etc. The amount of alcohol employed can be as little as 5 percent or even less, and up to 100 percent of the solvent used, i.e. the complete solvent system, can be substantially all monohydric alcohol, and preferably isopropanol because of its ready availability, low toxicity and ease of evaporation.

It is particularly desirable, according to the present invention, to achieve the proper balanced polymer solution for making improved films and coatings, for instance, that a primary or secondary aliphatic monoamine is added with the excess diamine to react with the prepolymer, in amounts up to about 25 percent of the equivalents, generally about 2 to 10 percent, based upon the total amine employed. The monoamine is preferably an alkylamine such as methylamine, ethylamine, diethylamine, diisopropylamine, or a cycloalkylamine, such as cyclohexylamine, and the like, or an alkanolamine such as ethanolamine, diethanolamine, isopropanolamine, and the like. The term "aliphatic" is used herein to include not only strictly aliphatic, but also cycloaliphatic monoamines.

According to the present invention, amine-terminated polyetherurethane-urea solutions of almost any viscosity can be employed, depending on the end use of the polymer and practical considerations. Good results are obtained, for instance, from polyetherurethane-urea solutions having a viscosity in the range of about 7,000–50,000 cps. for making films and coatings, and solutions of lower viscosity of as little as about 200 cps., or even lower, are operable, but not preferred. When making caulking compositions the viscosity can be 400,000 cps. or even greater. It is preferred of course to employ the least possible solvent so that less solvent need be evaporated upon curing.

The amine terminated polyetherurethane-urea, in solution, is stable at ambient temperatures and may be stored until ready for use. Before use, this solution is treated with a chain-extending amount of up to about 9 percent of a polyepoxide, such as the diglycidyl ether of p,p'-isopropylidene diphenol or the diglycidyl ether of the corresponding sulfone; butadiene dioxide; butanediol diglycidyl ether; 1,2,3-tris(2,3-epoxypropoxy)propane; epoxidized vegetable oils such as soybean oil; a polyepoxide of other known phenol-formaldehyde resin; polyepoxides of polyesters, such as polyesters of adipic acid, phthalic acid and terephthalic acid; epithio ethers, wherein the epoxy oxygen is replaced with sulfur; diglycidyl aniline; diglycidyl ethers of resorcinol; triglycidyl ether of trimethylolpropane; triglycidyl ether of glycerol; triglycidyl p-aminophenol; diglycidyl ether of bisphenol-hexafluoroacetone; diglycidyl ether of tetrachlorobisphenol-A; tetraglycidoxybiphenyl; diglycidyl ether of hydrogenated bisphenol-A; and polyepoxides prepared from the reaction of a vinyl compound, such as vinyl glycidyl ether, glycidyl acrylate, glycidyl methacrylata and the like, with an olefin, such as ethylene propylene, butadiene, acrylic acid, methacrylic acid, α-chloroacrylic acid, acrylonitrile, and the like, may also be employed in the present lacquer system, but not as a preference. Mixtures of two or more of the above polyepoxides may also be employed. While in the broader aspects of the present invention, virtually any polyepoxide can be used as a chain extender so long as it is employed in proportions up to about 9 percent by weight of the amine-terminated polyetherurethane-urea, it is especially advantageous that the polyepoxides employed be those normally liquid, less viscous polyepoxides which have molecular weights within the range of about 100 to about 900. Polyepoxides of higher molecular weight, i.e. over about 900 and up to about 2,000, for instance, may be employed in the present lacquer solvent system, so long as they are employed in proportions of up to about 9 percent, based on the amine terminated polyetherurethaneurea but because of practical considerations such as high viscosity of the polyepoxides, or even solid polyepoxides which must be solubilized, as the molecular weight increases over 1000, and generally difficult solubility, and compatibility problems they are not preferred.

Furthermore, when employing excess polyepoxide, in amounts much greater than 9 percent by weight of the polyetherurethane-urea, i.e. 10 percent and more, the resulting films and coatings become progressively less elastomeric and often less hydrolytically stable and thus not acceptable.

Polyepoxides which are especially desirable are di- and tri- epxoides having terminal epoxy groups such as the triglycidylether of phenol-formaldehyde resin the diglycidyl ether of p,p'-isopropylidenediphenol, and triglycidyl ether of glycerol, diglycidyl terephthalate and epoxidized soybean oil for instance. It is important to the achievement of the significant advantages of the present invention that the amount of the polyepoxide does not greatly exceed about 9 percent by weight of the amine-terminated polyetherurethane-urea present in the organic solvent solution and most desirably not above about 8 percent.

This reaction proceeds slowly at ambient temperatures and fairly rapidly at elevated temperatures. The resulting film or coating, for instance, is generally aged for several days at ambient temperatures to insure adequate curing.

Although the present two-component composition is prepared in organic solvents and used as such to make films, coatings and the like, the organic solvent solution may also be mixed and emulsified with water before use, employing procedures which, per se, are known in the art.

The following examples illustrate specific embodiments of the present invention and are not intended to be limiting. All examples may include in the formula, additives such as antioxidants and U.V. screening agents or various other supplemental agents, as known in the art, as determined by the artisan. Generally the addition of these agents, as known in the art, is preferred. Proportions are on a weight/weight basis unless otherwise specified.

EXAMPLE 1

1000 parts of poly(1,2-oxypropylene)glycol having a hydroxyl number 140, are dehydrated at 100°C. for 1 hour at 2 mm. Hg. and then allowed to react at about 100°C. for two hours with 380 parts of tolylene diisocyanate (80% 2,4; 20% 2,6 isomer). The prepolymer has a free NCO value of 5.7. Enough toluene is added to make a solution containing about 75% prepolymer and 25% solvent. With good mixing this prepolymer solution is added to a solution of 3-aminomethyl-3,5,5-trimethyl cyclohexylamine and diethylamine in a 70-30 mixture of toluene and isopropanol. In terms of equivalents the amount of diamine is 110% and the monoamine is 5% of the available NCO. The final solution has a total solids content of 35percent. To 100 parts of this solution is added 0.95 parts of an epoxylated phenol formaldehyde resin with a functionality of 3.8, representing about 110 percent of the available amine in terms of equivalents. A film is drawn on silicone paper and then cured using standard coating procedure. This film is aged for 3 to 6 days. The final film has good U.V., and excellent hydrolytic stability, and good abrasion resistance and stress-strain properties.

EXAMPLE 2

1000 parts of poly(1,2-oxypropylene)glycol, hydroxyl number 56, are dehydrated at 120°C. for one hour at 4 mm. Hg. and then allowed to react at 100°C. for four hours with 137 parts of 2,4-tolylene diisocyanate, to yield a prepolymer having a free NCO value of 2.1. Toluene is added to make a solution containing 90% solids. With good mixing this prepolymer solution is added to a solution of excess 3-aminomethyl-3,5,5-trimethyl cyclohexylamine and monobutylamine, in a solvent mixture of 90% isopropanol and 10% toluene. The diamine is 104% and the monoamine is 3% of the available NCO value in terms of equivalents. The final solution has a total solids content of 40 percent. To 110 parts of this solution is added 0.38 parts of an epoxy resin of the p,p'-isopropylidenediphenolepichlorohydrin type having an epoxy equivalent weight of about 190, representing about 140 percent of the available amine in terms of equivalents. The cast film after drying and aging for 3 to 6 days has good U.V., and excellent hydrolytic stability and good physical properties as in Example 1.

EXAMPLE 3

1000 parts of poly(oxytetramethylene)glycol, hydroxyl number 140, are dehydrated at 100°C. for one hour at 1 mm. Hg. and then allowed to react at 100°C. for two hours with 380 parts of tolylene diisocyanate (65% 2,4-; 35% 2,6-isomer). The prepolymer has a free NCO value of 5.6. Enough toluene is added to make a 75% solution of the prepolymer. With good mixing this prepolymer solution is added to a solution of 1,8-diamino-p-menthane and dibutylamine, in a 50-30-20 mixture of methyl ethyl ketone, toluene, and isopropanol. The diamine is 108% and the monoamine is 4% of the available NCO value in terms of equivalents. The final solution has a total solids of about 35 percent. To this solution is added a diglycidyl ether of p,p-isopropylidenediphenol having an epoxy equivalent of about 175 in an amount just equivalent to the available amine groups. An excellent polymer results after evaporation of solvent, which has excellent hydrolytic stability, good physical properties and shows only slight discoloration after exposure in an altas Weatherometer, at 145°F., 65 percent relative humidity, for 200 hours.

EXAMPLE 4

1000 grams of poly(oxyethylene)glycol, hydroxyl number 140, are dehydrated at 110°C. for two hours at 10 mm. Hg. and then allowed to react for 2 hours at 100°C. with 450 grams diphenylmethane-4,4'-diisocyanate. The prepolymer has a free NCO value of 3.2. Enough toluene is added to make a 90% solution of the prepolymer. With good mixing this prepolymer is added to a solution of 3-aminomethyl-3,5,5-trimethyl cyclohexylamine and ethanolamine in 10-90 mixture of toluene and isopropanol. The diamine is 104% and the monoamine is 3% of the available NCO value in terms of equivalents. Total solids are 40 percent. To 100 parts of this lacquer is added 0.55 grams of an epoxylated phenol-formaldehyde resin having an epoxy functionality of 2.2, before applying to a surface to impart a coating having excellent hydrolytic stability. The epoxy represents about 140 percent of the available amine in terms of equivalents.

EXAMPLE 5

1000 parts of poly(1,2-oxypropylene)glycol, hydroxyl number 112, are dehydrated at 120°C. for 1 hour at 1 mm. Hg. and then allowed to react at 100°C. for 5 hours with 518 parts of methylene-bis(cyclohexyl isocyanate). The prepolymer has a free NCO value of 5.4. Toluene is added to make a 75% solution of prepolymer. With good mixing this prepolymer solution is added to a solution of 3-aminomethyl-3,5,5-trimethyl cyclohexylamine and diethylamine in a 50—50 mixture of toluene and isopropanol. The diamine is 106% and the monoamine is 3% of the available NCO value in terms of equivalents. The final solution has a total solids of about 35 percent. To 100 parts of this solution is added 0.7 parts of a diglycidyl ether of p,p'-isopropylidenediphenol which has a functionality of about 2. The epoxy compound is equivalent to about 120% of the available amine in terms of equivalents. A film is drawn on silicone paper and then cured, using standard coating procedure. After allowing to age for 3 to 6 days, the film exhibits excellent hydrolytic stability, resistance to ultraviolet light and excellent physical properties as in Example 1.

EXAMPLE 6

A lacquer solution is prepared as in Example 5, the solvent, however, consisting of 20 parts of toluene, 70 parts of isopropanol and 10 parts of water in place of the 50—50 mixture of toluene-isopropanol of Example 5. A film is prepared from this lacquer solution, as in Example 5, having similar properties.

EXAMPLE 7

A lacquer solution is prepared as in Example 5, wherein 0.7 part of diglycidyl terephthalic acid is employed in place of the diglycidyl ether of p,p -isopropylidene diphenol, to chain-extend the amine terminated polyetherurethane-urea.

EXAMPLE 8

A lacquer solution is prepared as in Example 2, wherein 0.65 parts of epoxidized soybean oil is employed in place of the p,p-isopropylidenediphenol polyepoxide, to chain-extend the amine terminated

We claim:

1. A curable polymer-forming lacquer solution comprising:
   a. An amine terminated polyetherurethane-urea prepared by the addition of an isocyanate terminated polyalkylene ether diol prepolymer to an excess of diamine, there being at least one active hydrogen on each amine group of said diamine, in an organic solvent system, and
   b. A chain-extending amount of a polyepoxide of about 0.1 to about 9.0 percent, by weight, based on said amine-terminated polyetherurethane-urea present in said organic solvent system of component (a).

2. A composition as in claim 1 wherein under (b) the chain extending amount of polyepoxide is in the range of about 1.0–5.0 percent, by weight, based on said amine terminated polyetherurethane-urea.

3. A composition as in claim 1 wherein the epoxide is the diglycidyl ether of p,p'-isopropylidene-diphenol.

4. A composition as in claim 1 wherein the epoxide is a triglycidyl ether of a phenol-formaldehyde resin.

5. A composition as in claim 1 wherein the epoxide is 1,2,3,-tris(2,3-epoxypropoxy)propane.

6. A composition as in claim 1 wherein the polyetherurethane urea is derived from a cycloaliphatic diamine.

7. A composition as in claim 1 wherein the polyetherurethane-urea is derived from 3-aminomethyl-3,5,5-trimethyl cyclohexylamine.

8. A composition as in claim 1 wherein the polyetherurethane-urea is derived from 1,8-diamino-p-menthane.

9. A composition as in claim 1 wherein the polyetherurethane-urea is derived from hexahydropyrazine.

10. A composition as in claim 1 wherein the polyetherurethane-urea is derived from excess diamine containing up to 25 percent equivalents based upon total amine, of a primary or secondary aliphatic monoamine.

11. A composition as in claim 1 wherein the organic solvent is a conventional lacquer solvent containing more than about 5 percent of a $C_1$–$C_5$ monohydric alcohol.

12. A composition as in claim 1 wherein the organic solvent is a toluene-isopropanol mixture.

13. A composition as in claim 1 wherein the organic solvent is substantially all isopropanol.

14. A curable polymer-forming lacquer solution comprising:
   a. An amine terminated polyetherurethane-urea prepared by the addition of an isocyanate terminated polyalkylene ether diol prepolymer to an excess of diamine, there being at least one active hydrogen on each amine group of said diamine, in one organic solvent system, and
   b. A polyepoxide having a molecular weight within the range of about 100 to about 900, said polyepoxide being utilized in a chain-extending proportion of up to about 9% by weight of said amine terminated polyetherurethane-urea present in said organic solvent system of component (a).

15. The method of chain extending an amine terminated polyetherurethane-urea with a polyepoxide to produce a polymer-forming lacquer solution comprising reacting an isocyanate terminated polyalkylene ether diol prepolymer with an excess of diamine, there being at least one active hydrogen on each amino group of said diamine, in an organic solvent system and chain-extending with an amount of a polyepoxide of about 0.1 to about 9.0 percent by weight, based on said amine terminated polyetherurethane-urea.

16. The method of chain-extending an amine terminated polyetherurethane-urea as in claim 15, wherein the organic solvent system is a toluene-isopropanol mixture.

17. The polymer formed by curing the composition of claim 1.

* * * * *